No. 724,314. PATENTED MAR. 31, 1903.
C. MOLLER & M. SALISBURY.
OIL TANK ATTACHMENT.
APPLICATION FILED NOV. 18, 1902.
NO MODEL.
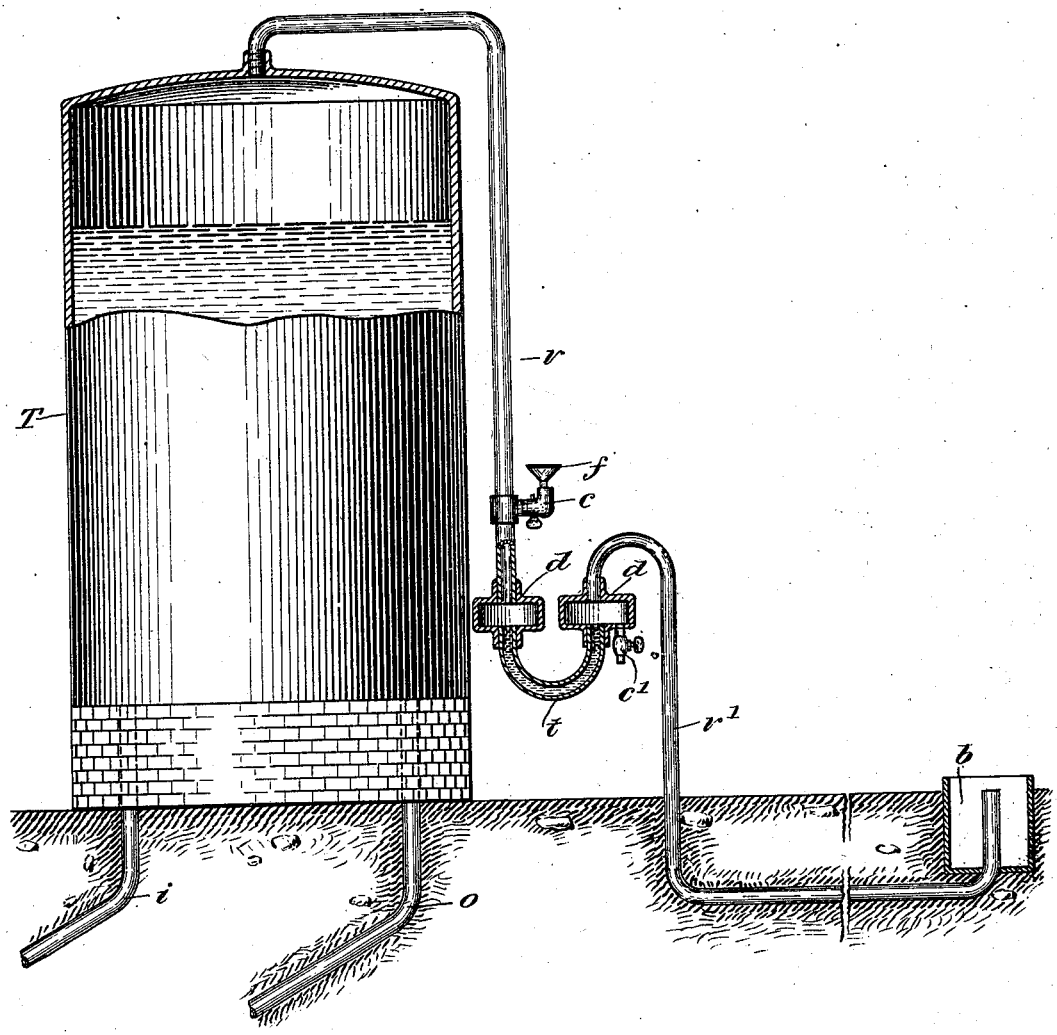
WITNESSES:
William P. Goebel.
Isaac B. Owens.
INVENTORS
Carl Moller
Mathias Salisbury
BY Munn
ATTORNEYS.

UNITED STATES PATENT OFFICE.

CARL MOLLER AND MATHIAS SALISBURY, OF PENSACOLA, FLORIDA.

OIL-TANK ATTACHMENT.

SPECIFICATION forming part of Letters Patent No. 724,314, dated March 31, 1903.

Application filed November 18, 1902. Serial No. 131,841. (No model.)

*To all whom it may concern:*

Be it known that we, CARL MOLLER and MATHIAS SALISBURY, citizens of the United States, and residents of Pensacola, in the county of Escambia and State of Florida, have invented a new and Improved Oil-Tank Attachment, of which the following is a full, clear, and exact description.

This invention relates to a means for guarding against explosions in tanks containing volatile hydrocarbons and like substances. As is well known, such explosions are due to the presence of vapors in the tank, these vapors being continually given off from the oils. Our invention involves an improved means for disposing of these vapors.

In carrying out the invention we provide a pipe or other connection leading from the top of the oil-tank to a point distant from the tank, this pipe carrying off the vapors and discharging them at such distant point which is so far removed from the tank as ordinarily to insure against communicating combustion to the tank. In order, however, to make this effect absolutely certain, we interpose in the pipe a trap which automatically allows the exit of vapor from the tank and the entry of air thereinto, but which is so arranged that should the vapor take fire at the outer end of this pipe this trap will prevent the fire from passing into the inner part of the pipe and reaching the oil in the tank. A part of the said pipe, preferably the outer part, is led to or into the ground, so that should lightning strike the tank the electric fluid will be led into the earth.

This specification is an exact description of one example of our invention, while the claims define the actual scope thereof.

Reference is to be had to the accompanying drawing, forming a part of this specification, in which the figure represents a sectional elevation of the invention.

T indicates the tank, and $i$ and $o$ indicate, respectively, the oil inlet and outlet pipes.

$v$ indicates the inner part of the vapor-pipe, which passes from the dome or top of the tank downward to the trap. The trap comprises a bend $t$, each end of which communicates with a drum $d$. The pipe-section $v$ extends into one drum $d$, and from the other drum passes the outer pipe-section $v'$, this outer part of the vapor-pipe thence extending into the earth and leading away from the tank to any desired distance.

$b$ indicates a box into which the discharge end of the vapor-pipe is extended, this box serving to keep debris away from the pipe. Said box may, if desired, be provided with a cover or grating.

$c$ indicates a cock which is placed in the pipe-section $v$ just above the trap, and on this cock is mounted a funnel $f$. The cock $c$ is normally closed; but when it is desired to fill the bend $t$ of the trap with water or other liquid the cock $c$ should be opened and the liquid poured in through the funnel $f$.

$c'$ indicates a cock which passes from the bottom of the drum $d$, which communicates with the outer pipe $v'$. During the filling of the trap the cock $c'$ should be opened, so that should the water rest upon the upper ends of the bend $t$ it will flow out. This insures keeping the drums $d$ normally empty. After the trap has been filled and during the ordinary operation of the apparatus the cocks $c$ and $c'$ should be closed. The trap seals the vapor-pipe $v\ v'$ until the pressure of vapor within the tank becomes sufficiently great to displace the water in the bend $t$, this pressure forcing the water upward into the outer drum $d$, and the vapor thus passing off to the atmosphere. A reversal of this operation takes place when the oil is being withdrawn from the tank, and the exterior air-pressure acts on the outer end of the trap to force the water from the bend $t$ into the inner drum $d$, which allows the air to pass the trap and fill the vacant space occasioned by the removal of the oil. It will be therefore observed that the apparatus affords an automatic vent for the pressures within the tank and allows the atmosphere to enter the tank as may be required, but at the same time seals the vapor-pipe against burning vapors, and should the vapor at the discharge end of the pipe-section $v'$ become fired the burning vapors cannot pass the trap and enter the tank to cause an explosion. It will also be apparent that since the pipe $v\ v'$ leads into the earth should lightning strike the tank this pipe will serve as a conductor, grounding the electric fluid.

Various changes in the form, proportions, and minor details of our invention may be resorted to at will without departing from the spirit and scope thereof. Hence we consider ourselves entitled to all such variations as may lie within the intent of our claims.

Having thus described our invention, we claim as new and desire to secure by Letters Patent—

1. The combination with a tank for containing a hydrocarbon, of a vapor-pipe leading from the top thereof and having an open outer end, and a trap interposed in the pipe between its ends for the purpose specified, said trap comprising a bend and a drum at each end thereof whereby provision is made for allowing the vapor to escape from the tank and air to enter the tank to fill the space caused by the removal of the hydrocarbon.

2. The combination with a tank, of a pipe leading from the top thereof, a drum with the top of which the end of the pipe is connected, a second drum, a pipe connected with the top of the second drum and having an open outer end, and a bend leading into the bottoms of the drums, and adapted to be filled with a liquid, whereby the liquid in the bend is adapted to be forced into the drums, into one by the pressure in the tank and into the other by atmospheric pressure when the hydrocarbon is being withdrawn from the tank.

3. The combination with a tank, of a vapor-pipe leading therefrom, a trap interposed in the pipe and comprising a bend with a drum at each end, a cock in one drum for the purpose specified, and means for permitting filling the trap.

4. The combination with a tank, of a vapor-pipe leading therefrom, a trap interposed in the pipe and comprising a bend and a drum at each end, a cock in one drum for the purpose specified, and means for filling the trap, said means for filling the trap consisting of a cock and a funnel attached thereto and directly communicating therewith.

In testimony whereof we have signed our names to this specification in the presence of two subscribing witnesses.

CARL MOLLER.
MATHIAS SALISBURY.

Witnesses:
JNO. E. CREGER,
GEO. A. BERRY.